R. W. PETERSON.
SWIVEL TRACTION BAR WITH FRAME AND CROSS SUPPORTS.
APPLICATION FILED JULY 10, 1912.
1,069,721.
Patented Aug. 12, 1913.
2 SHEETS—SHEET 1.
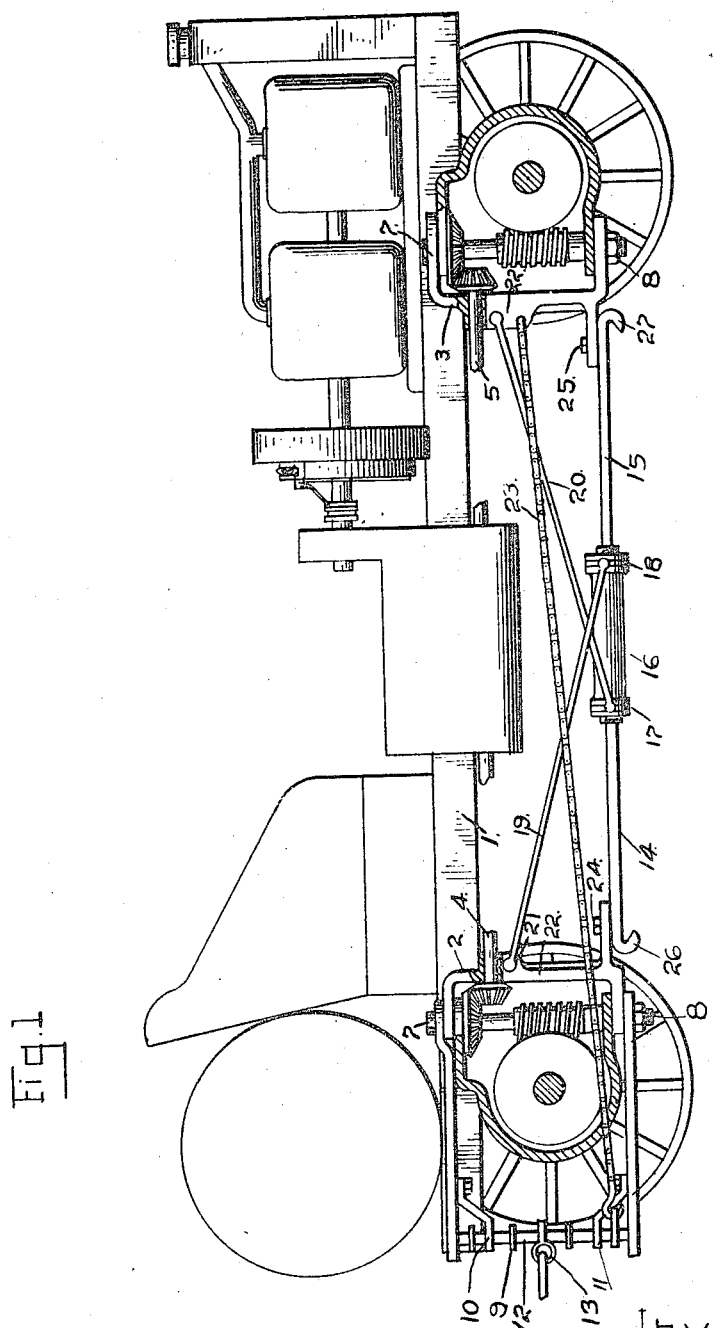

R. W. PETERSON.
SWIVEL TRACTION BAR WITH FRAME AND CROSS SUPPORTS.
APPLICATION FILED JULY 10, 1912.
1,069,721.
Patented Aug. 12, 1913.
3 SHEETS—SHEET 2.
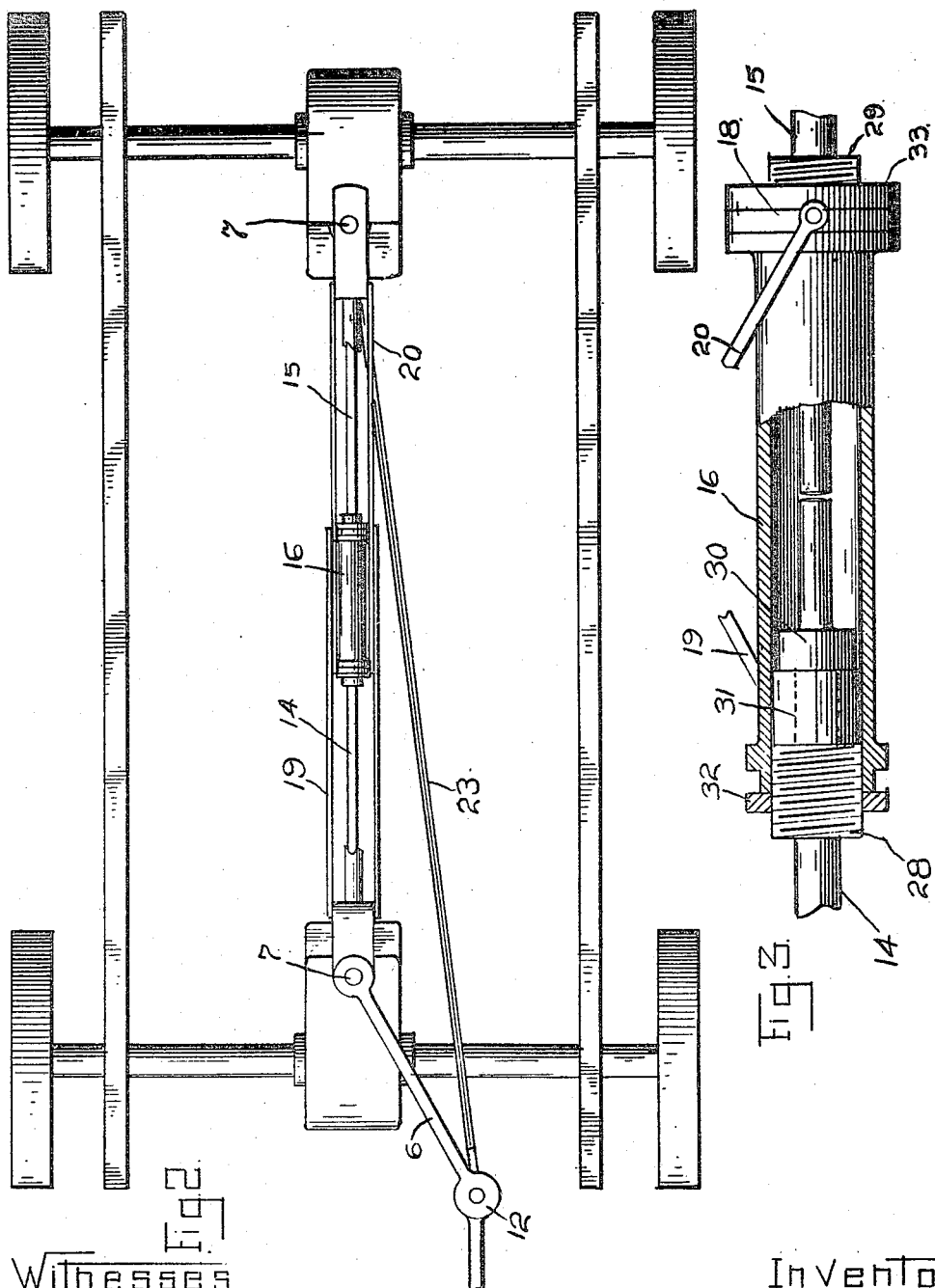

UNITED STATES PATENT OFFICE.

RAFORD W. PETERSON, OF SANTA ROSA, CALIFORNIA.

SWIVEL TRACTION-BAR WITH FRAME AND CROSS-SUPPORTS.

1,069,721.  Specification of Letters Patent.  Patented Aug. 12, 1913.

Application filed July 10, 1912. Serial No. 708,591.

*To all whom it may concern:*

Be it known that I, RAFORD W. PETERSON, a citizen of the United States, residing at Santa Rosa, county of Sonoma, State of California, have invented certain new and useful Improvements in Swivel Traction-Bars with Frames and Cross-Supports, of which the following is a specification.

My invention relates to swivel traction bars with frame and cross-supports, but more particularly to its use in motor driven vehicles.

The object of my invention is to provide a flexible, adjustable and strong means for traction, such as the drawing of a plow or cultivator through the soil.

My invention is illustrated in the accompanying drawings, in which:—

Figure 1, is a side elevation of a motor drawn vehicle with swivel traction bar, frame and cross-supports in place. Fig. 2, is a plan view of the running gear of a motor drawn vehicle, showing the swivel traction bar, with frame and cross-supports in place; also angle adjustment. Fig. 3, is a broken cross-section showing the swivel heads of the traction bars; also the movable anchorage of the cross-supports.

1 is the chassis; 2 and 3 are the yokes carrying the driving pinions 4 and 5; 6 is the traction frame; 7 and 8 are the king bolts supporting the yokes 2 and 3, and the traction frame 6; 9 is a group of spacing collars; 10 and 11 are angle braces supporting the upright bar 12; 13 is a clevis for attaching the load to the traction frame; 14 and 15 are the swivel headed traction bars, and 16 is the swivel case; 17 and 18 are the movable anchorages of the bar ends for the cross-supports; 19 and 20 are the cross-supports; 21 and 22 are the yoke lugs to which are secured the upper ends of the cross-supports; 23 is a means for the angle adjustment of the traction frame 6, (in this particular case I have shown a chain); 24 and 25 are the stud bolts securing the outer ends of the traction bars to the yokes 2 and 3; 26 and 27 are the looped ends of the traction bars 14 and 15; 28 and 29 are threaded bushings for the swivel case 16, securing the swivel heads 30 of the traction bars 14 and 15; 31 is a split collar; 32 and 33 are jam nuts on the threaded bushings 28 and 29.

The operation of my invention is as follows: The object to be drawn is attached to the traction frame 6 by a clevis, or any suitable means. The elevation of this attachment can be varied by means of the spacing collars 9, on the upright bars 12. This bar is reinforced and strengthened by the introduction of the angle braces 10 and 11. The traction frame 6 is made laterally adjustable by a swiveled mounting, such as king bolts 7 and 8. This lateral adjustment enables me to shift the object to be drawn to the right or left of the center of the vehicle and is maintained by the chain 23, or any suitable means. I secure the forward end of said chain to the vehicle by any desirable method (shown in the drawing as attached to the yoke 3). In this instance the yokes 2 and 3 carry the bearings for the main driving pinions 4 and 5 and are attached to the vehicle by swiveled mountings on the gear casing. At the lower end and projecting inwardly from yokes 2 and 3 are the extensions by means of which the traction bars 14 and 15 are secured with stud bolts 24 and 25. The traction bars 14 and 15 are provided with hooks or the like as indicated at 26 and 27 so as to provide for the attachment of devices which it is desirable to draw from a lower level, such, for instance, as stone boats, fodder sleds, logs, etc. The swivel heads of the traction bars 14 and 15 are inclosed by a case 16. Said case is threaded inside of each end to receive threaded bushings 28 and 29. The split collar 31 is introduced between the enlarged head 30 of the traction bar and the threaded bushing 28. This prevents the traction bar from being withdrawn from the sleeve. The threaded bushings 28 and 29 also provide a means for adjustment of said bars. Projecting beyond the enlarged swivel-head 30 is an extension of bars 14 and 15 of such length as to cause them to meet in the center of the case 16. This prevents bars 14 and 15 from being forced inwardly. The jam nuts 32 and 33 are the locking device preventing the loosening of the threaded bushings 28 and 29 and are of such size as to form a channel or groove to carry the movable anchors 18, to which are attached the cross-supports 19 and 20. It will be readily seen that a load strain carried by the clevis 13, on the traction frame 6, would be communicated to the swiveled case 16 through the traction bar 14. Under this condition the cross-supports 20 would carry that strain. If the load strain were transferred to the front of the vehicle, and carried at the hook end of the traction bar 15, the load strain would be communicated to the swiveled case 16 through the traction bar 15. Under this condition the cross-supports 19 would carry the load. The traction bars 14 and 15 being swiveled or rotatably mounted in the swiveled case 16, provide a means for a perfect compensation for all torque strains caused by the unevenness of the ground over which the vehicle is being driven. At the same time it remains rigid as a tractor. The cross-supports 19 and 20 are rotatably mounted on the outside and on each end of the case 16, crossing each other. The crossing of these supports brings them into tensile strain as either end of the traction bars 14 and 15 are in use. They are also free from torque strain caused by the unevenness of the road over which the vehicle is driven.

I do not limit myself to the particular construction herein described but desire to avail myself of any changes which may come within the scope of my invention.

Having thus described my invention, what I claim as new and desire to secure by Letters Patent, is:—

1. In combination with a traction frame, parallel bars, eyes at one end of said bars, king bolts for securing said eyes, an upright bar for connecting the other end of said parallel bars, and spacing collars on said upright bar, substantially as described and claimed.

2. In a traction frame and in combination, parallel bars, eyes in one end of said parallel bars, pins for mounting said eyes, an upright bar connecting the other end of said parallel bars, angle braces supporting the upright bar, and spacing collars on said bar, substantially as described.

3. In a traction frame and in combination, means for securing the lateral adjustment of said frame, parallel bars, eyes in one end of said parallel bars, pins for mounting said bars, an upright bar for connecting the other end of said parallel bars, angle braces supporting the upright bar, and spacing collars on said bar, substantially as described and claimed.

4. In combination with a traction frame, a yoke, a bearing in said yoke, eyes in the end of the yoke, stud bolts for securing said eyes, an extension on the lower side of said yoke, a traction bar and a hook or loop on one end of said traction bar, substantially as described.

5. In combination with a traction frame, yokes, pinions, eyes, extensions, traction bars, hooks or loops at one end of said bars, swivel-heads on the other end of said bars, split bushings back of the swivel-heads, a case for said swivel-heads, and threaded bushings with jam nuts for said case, substantially as described.

6. In combination with a traction frame, yokes, pinions, eyes, extensions, traction bars, hooks or loops at one end of said bars, swivel-heads on the other end of said bars, split bushings back of the swivel-heads, a case for said swivel-heads of the traction bars with threaded bushings and jam nuts, collars for the swiveled case, cross-supports, eyes in each end of the cross supports, means for securing the eyes to the collars at one end and means for securing the eyes to the yoke at the other end, substantially as described and claimed.

7. In combination with a vehicle, traction bars, a coupling to which the adjacent ends of the traction bars are swiveled, said traction bars at their front and rear ends respectively being secured to frame parts of the vehicle, and cross bars attached respectively at their front and rear ends to frame parts of the vehicle and having swivel connection with the coupling, substantially as described.

In testimony whereof, I affix my signature in presence of two witnesses.

RAFORD W. PETERSON.

Witnesses:
O. A. EGGERS,
WETH GRANT MURRAY.